US012440299B2

(12) United States Patent
Ofer et al.

(10) Patent No.: US 12,440,299 B2
(45) Date of Patent: Oct. 14, 2025

(54) SYSTEM AND METHOD FOR DRAPE VOLUME CONTROL

(71) Applicant: Mazor Robotics Ltd., Caesarea (IL)

(72) Inventors: Nir Ofer, Tel Aviv-Jaffa (IL); Ori Ben Zeev, Tel Aviv (IL)

(73) Assignee: Mazor Robotics Ltd., Caesarea (IL)

( * ) Notice: Subject to any disclaimer, the term of this patent is extended or adjusted under 35 U.S.C. 154(b) by 802 days.

(21) Appl. No.: 17/331,491

(22) Filed: May 26, 2021

(65) Prior Publication Data
US 2021/0369378 A1 Dec. 2, 2021

Related U.S. Application Data

(60) Provisional application No. 63/031,197, filed on May 28, 2020.

(51) Int. Cl.
*A61B 46/10* (2016.01)
*A61B 34/00* (2016.01)
*A61B 34/10* (2016.01)

(52) U.S. Cl.
CPC .............. *A61B 46/10* (2016.02); *A61B 34/10* (2016.02); *A61B 34/70* (2016.02); *A61B 2034/101* (2016.02); *A61B 2034/107* (2016.02)

(58) Field of Classification Search
None
See application file for complete search history.

(56) References Cited

U.S. PATENT DOCUMENTS

| 5,122,904 A | 6/1992 | Fujiwara et al. |
| 5,608,574 A | 3/1997 | Heinrich |
| 5,709,670 A * | 1/1998 | Vancaillie ........... A61M 3/0233 604/246 |

(Continued)

FOREIGN PATENT DOCUMENTS

| GB | 2552553 | 1/2018 |
| JP | 2018-134353 | 8/2018 |
| WO | WO 2018/217430 | 11/2018 |

OTHER PUBLICATIONS

"OPMI® Drapes with VisionGuard® Drape your microscope—not your view," Carl Zeiss, 2004, 12 pages.
(Continued)

*Primary Examiner* — Hua Lu
(74) *Attorney, Agent, or Firm* — Sheridan Ross P.C.

(57) ABSTRACT

A system for controlling a volume of a drape according to one embodiment of the present disclosure comprises a drape operable to substantially cover an articulated member and having a pressure source opening and at least one tool opening, the pressure source opening defining a path for a fluid to flow into or out of a volume substantially enclosed by the drape, the at least one tool opening enabling a tool to be supported by the articulated member outside of the volume substantially enclosed by the drape; at least one sensor operable to monitor a characteristic of the system; and a controller that causes the volume substantially enclosed by the drape to increase to a maximum volume, decrease to a minimum volume, or maintain an operating volume, and wherein the drape increasingly conforms to the articulated member as the volume substantially enclosed by the drape is decreased.

17 Claims, 5 Drawing Sheets

(56) References Cited

U.S. PATENT DOCUMENTS

| | | | | |
|---|---|---|---|---|
| 8,784,435 B2* | 7/2014 | Cooper | | A61B 34/00 |
| | | | | 606/108 |
| 8,893,721 B2* | 11/2014 | Futrell, Jr. | | A61B 46/40 |
| | | | | 128/853 |
| 9,563,045 B2* | 2/2017 | Doi | | A61B 90/20 |
| 10,039,605 B2* | 8/2018 | Kostrzewski | | A61B 17/17 |
| 10,357,324 B2* | 7/2019 | Flatt | | A61B 34/70 |
| 10,383,507 B2* | 8/2019 | Czupalla | | A61B 1/128 |
| 2003/0066534 A1* | 4/2003 | Spetzler | | A61B 46/10 |
| | | | | 128/849 |
| 2006/0161137 A1* | 7/2006 | Orban, III | | A61B 46/10 |
| | | | | 606/1 |
| 2008/0017292 A1* | 1/2008 | Gammons | | A61B 46/10 |
| | | | | 156/321 |
| 2009/0248038 A1* | 10/2009 | Blumenkranz | | A61B 34/30 |
| | | | | 606/130 |
| 2013/0236338 A1* | 9/2013 | Locke | | F04B 53/10 |
| | | | | 417/413.1 |
| 2015/0202009 A1* | 7/2015 | Nussbaumer | | A61B 46/10 |
| | | | | 128/856 |
| 2017/0270763 A1* | 9/2017 | Hastings | | H04W 4/029 |
| 2018/0140372 A1* | 5/2018 | Nakamura | | A61B 46/10 |
| 2018/0161111 A1* | 6/2018 | Overmyer | | A61B 34/73 |
| 2018/0200014 A1* | 7/2018 | Bonny | | A61B 34/30 |
| 2018/0318475 A1* | 11/2018 | Thomson | | A61M 1/90 |
| 2019/0076204 A1* | 3/2019 | Robertson | | A61B 34/30 |
| 2019/0083182 A1* | 3/2019 | Roach | | B25J 19/0083 |
| 2019/0083193 A1* | 3/2019 | Cohen | | A61B 46/10 |
| 2019/0231460 A1* | 8/2019 | DiMaio | | A61B 34/32 |
| 2020/0093556 A1* | 3/2020 | Zemlok | | A61B 34/30 |
| 2021/0052432 A1* | 2/2021 | Buan | | A61F 13/022 |
| 2021/0128091 A1* | 5/2021 | Youd | | A61B 6/462 |
| 2021/0187175 A1* | 6/2021 | Quintanar | | A61M 1/913 |
| 2021/0299347 A1* | 9/2021 | Buan | | A61F 13/0206 |
| 2021/0308318 A1* | 10/2021 | Holm | | A61L 15/24 |
| 2023/0082871 A1* | 3/2023 | Simi | | A61B 90/08 |
| | | | | 606/130 |
| 2023/0114346 A1* | 4/2023 | Simi | | A61B 34/74 |
| | | | | 606/1 |

OTHER PUBLICATIONS

International Search Report and Written Opinion for International (PCT) Patent Application No. PCT/IB2021/054214, dated Jul. 21, 2021 14 pages.

International Preliminary Report on Patentability for International (PCT) Patent Application No. PCT/IB2021/054214, dated Dec. 8, 2022 7 pages.

* cited by examiner

SYSTEM AND METHOD FOR DRAPE VOLUME CONTROL

CROSS REFERENCE TO RELATED APPLICATIONS

This application claims the benefit of U.S. Provisional Application No. 63/031,197, filed on May 28, 2020, and entitled "System and Method for Drape Volume Control", which application is incorporated herein by reference in its entirety.

FIELD

The present technology is related generally to drapes and, more particularly, to controlling a volume substantially enclosed by a drape.

BACKGROUND

Surgical drapes are used during surgical operations to maintain sterility during the operation by preventing contact between non-sterile surfaces and sterile surfaces. The surgical drape may enclose one or more non-sterile pieces of equipment and/or tools to create a barrier between the equipment/tools and the patient. Surgical drapes may be oversized to accommodate equipment of various shapes and sizes as well as movement of the equipment.

SUMMARY

A system for controlling a volume of a drape according to one embodiment of the present disclosure may comprise a drape configured to at least partially cover an articulated member; and a controller configured to cause a volume enclosed by the drape to change in connection with movement of the articulated member, wherein the drape increasingly conforms to the articulated member as the volume enclosed by the drape is decreased.

The controller may be configured to cause the volume enclosed by the drape to change based at least in part on input from at least one sensor configured to monitor at least one of a pressure inside the volume enclosed by the drape or a fluid flow through one or more openings in the drape. The at least one sensor may be positioned inside or outside of the volume enclosed by the drape. The controller may be configured to cause the volume enclosed by the drape to increase prior to a planned movement of the articulated member. The controller may be configured to cause the volume enclosed by the drape to decrease after the planned movement of the articulated member. The controller may be configured to cause a pressure source to remove fluid from the enclosed volume via a pressure source opening.

The system may further comprise a pressure source configured for fluid communication with the volume enclosed by the drape. The system may further comprise at least one sensor configured to monitor pressure within the volume enclosed by the drape, and wherein the controller is configured to detect a collision between the drape and an external object based on input from the at least one sensor. The controller may be configured to change the volume enclosed by the drape by altering an operating pressure within the volume enclosed by the drape between a first pressure that is greater than an ambient pressure and a second pressure that is less than the ambient pressure. The controller may be configured to change the volume enclosed by the drape by altering an operating pressure within the volume enclosed by the drape between a first pressure that is less than an ambient pressure and a second pressure, different than the first pressure, that is also less than the ambient pressure. The controller may be configured to change the volume enclosed by the drape by altering an operating pressure within the volume enclosed by the drape. The drape may comprise at least one tool opening enabling a tool to be supported by the articulating member outside of the volume enclosed by the drape.

Another system for controlling a volume substantially enclosed by a drape according to one embodiment of the present disclosure may comprise a pressure source operable to selectively increase, maintain, or decrease a volume between a drape and an articulated member by selectively applying positive pressure or negative pressure to the volume; at least one sensor operable to monitor a characteristic of the system; and a controller that controls the pressure source based at least in part on data from the sensor, wherein the drape increasingly conforms to the articulated member as the volume substantially enclosed by the drape is decreased.

The characteristic may be at least one of a pressure inside the volume substantially enclosed by the drape or a fluid flow through an opening in the drape. The characteristic may be movement of the articulated member. The characteristic may be may be one or more leaks in the drape. The controller may further controls the pressure source based at least in part on information corresponding to movement of the articulated member. At least a portion of the articulated member may be repositionable when the drape is conformed to the articulated member. The controller may cause the pressure source to form a vacuum between the drape and the articulated member by causing fluid to exit the substantially enclosed volume via the pressure source opening. The vacuum between the drape and the articulated member may be continuously maintained to prevent one or more leaks in the drape. The controller may detect an impact to the drape based on data received from the at least one sensor.

A method for controlling a volume of a drape according to one embodiment of the present disclosure may comprise receiving a surgical plan, the surgical plan including information about one or more planned movements of an articulated member at least partially enclosed by a drape; determining, based on the surgical plan, a sequence of increasing and decreasing a volume enclosed by the drape and surrounding at least part of the articulated member; and generating instructions based on the sequence, the instructions configured to cause a controller to control a pressure source to increase and decrease the volume according to the sequence.

The sequence may comprise increasing the volume substantially enclosed by the drape prior to a planned movement of the articulated member. The articulated member may include a first moveable segment and a second moveable segment. The drape may include a first portion enclosing a first volume that at least partially encompasses the first moveable segment and a second portion enclosing a second volume that at least partially encompasses the second segment. The surgical plan may include information about one or more planned movements of each of the first moveable segment and the second moveable segment. The instructions may be configured to cause the controller, based on the surgical plan, to control the pressure source to increase the first volume in connection with movement of the first moveable segment of the articulated member while decreasing or maintaining the second volume in connection with a stationary status of the second moveable segment of the articulated member.

The details of one or more aspects of the disclosure are set forth in the accompanying drawings and the description below. Other features, objects, and advantages of the techniques described in this disclosure will be apparent from the description and drawings, and from the claims.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. When each one of A, B, and C in the above expressions refers to an element, such as X, Y, and Z, or class of elements, such as $X_1$-$X_n$, $Y_1$-$Y_m$, and $Z_1$-$Z_o$, the phrase is intended to refer to a single element selected from X, Y, and Z, a combination of elements selected from the same class (e.g., $X_1$ and $X_2$) as well as a combination of elements selected from two or more classes (e.g., $Y_1$ and $Z_o$).

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below.

Numerous additional features and advantages of the present invention will become apparent to those skilled in the art upon consideration of the embodiment descriptions provided hereinbelow.

BRIEF DESCRIPTION OF THE DRAWINGS

The accompanying drawings are incorporated into and form a part of the specification to illustrate several examples of the present disclosure. These drawings, together with the description, explain the principles of the disclosure. The drawings simply illustrate preferred and alternative examples of how the disclosure can be made and used and are not to be construed as limiting the disclosure to only the illustrated and described examples. Further features and advantages will become apparent from the following, more detailed, description of the various aspects, embodiments, and configurations of the disclosure, as illustrated by the drawings referenced below.

DETAILED DESCRIPTION

Figure 1:
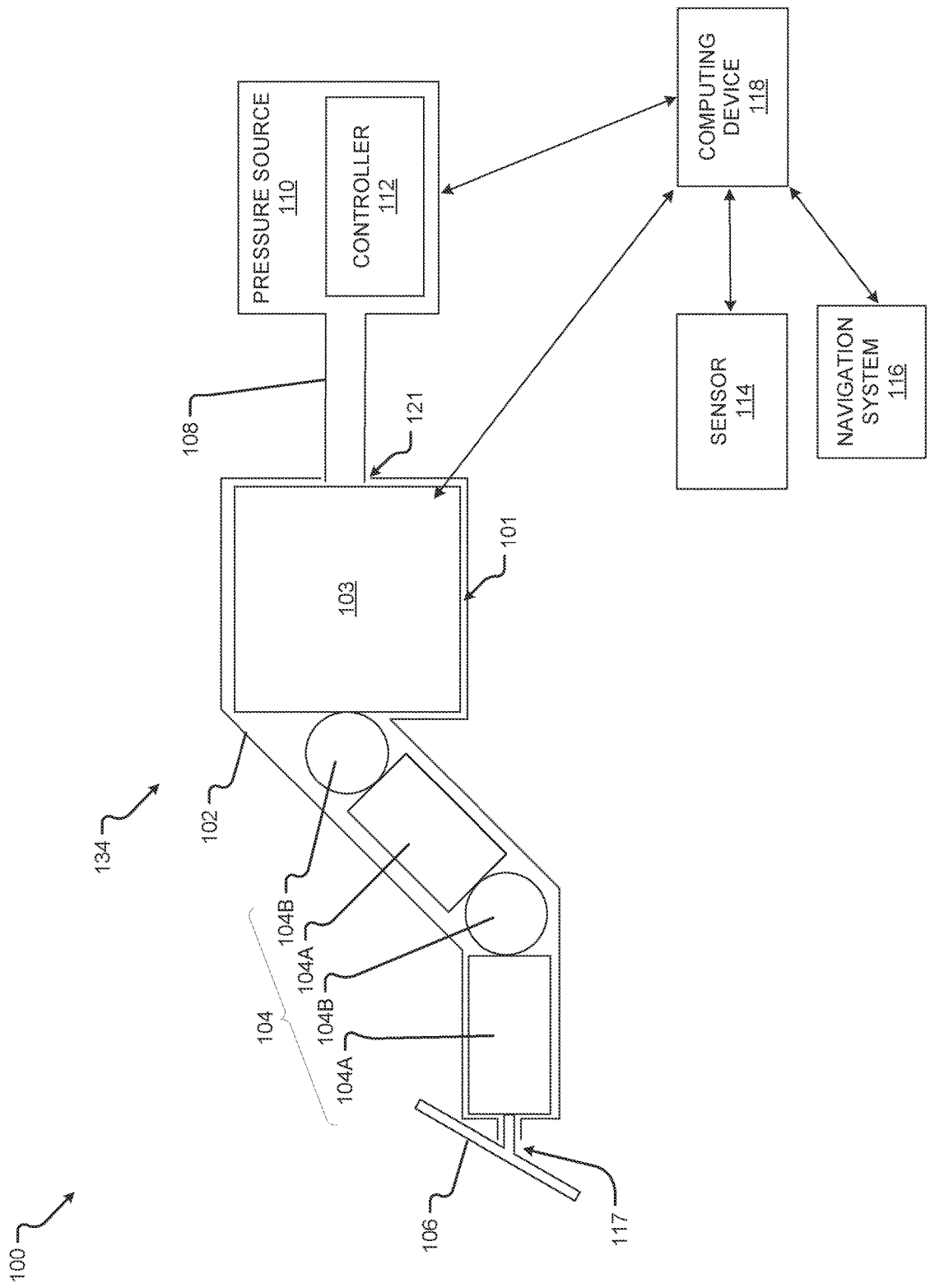
FIG. 1 is a block diagram of a system according to at least one embodiment of the present disclosure.

It should be understood that various aspects disclosed herein may be combined in different combinations than the combinations specifically presented in the description and accompanying drawings. It should also be understood that, depending on the example or embodiment, certain acts or events of any of the processes or methods described herein may be performed in a different sequence, and/or may be added, merged, or left out altogether (e.g., all described acts or events may not be necessary to carry out the disclosed techniques according to different embodiments of the present disclosure). In addition, while certain aspects of this disclosure are described as being performed by a single module or unit for purposes of clarity, it should be understood that the techniques of this disclosure may be performed by a combination of units or modules associated with, for example, a computing device and/or a medical device.

In one or more examples, the described methods, processes, and techniques may be implemented in hardware, software, firmware, or any combination thereof. If implemented in software, the functions may be stored as one or more instructions or code on a computer-readable medium and executed by a hardware-based processing unit. Computer-readable media may include non-transitory computer-readable media, which corresponds to a tangible medium such as data storage media (e.g., RAM, ROM, EEPROM, flash memory, or any other medium that can be used to store desired program code in the form of instructions or data structures and that can be accessed by a computer).

Instructions may be executed by one or more processors, such as one or more digital signal processors (DSPs), general purpose microprocessors (e.g., Intel Core i3, i5, i7, or i9 processors; Intel Celeron processors; Intel Xeon processors; Intel Pentium processors; AMD Ryzen processors; AMD Athlon processors; AMD Phenom processors; Apple A10 or 10X Fusion processors; Apple A11, A12, A12X, A12Z, or A13 Bionic processors; or any other general purpose microprocessors), application specific integrated circuits (ASICs), field programmable logic arrays (FPGAs), or other equivalent integrated or discrete logic circuitry. Accordingly, the term "processor" as used herein may refer to any of the foregoing structure or any other physical structure suitable for implementation of the described techniques. Also, the techniques could be fully implemented in one or more circuits or logic elements.

Before any embodiments of the disclosure are explained in detail, it is to be understood that the disclosure is not limited in its application to the details of construction and the arrangement of components set forth in the following description or illustrated in the drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Further, the present disclosure may use examples to illustrate one or more aspects thereof. Unless explicitly stated otherwise, the use or listing of one or more examples (which may be denoted by "for example," "by way of example," "e.g.," "such as," or similar language) is not intended to and does not limit the scope of the present disclosure.

In some applications, a surgical drape can be manufactured to custom fit a piece of equipment or other object to be covered by the drape to prevent bunching of excess material and to prevent interference during the surgical operation. However, a form-fitting drape may be unsuitable or unable to accommodate movement of the piece of equipment or other objects. In some applications, a surgical drape may be formed from biocompatible material. However, biocompatible drapes are expensive to produce and purchase. In other applications, an oversized drape may be manually pulled taut when the equipment is stationary; however, excess material may gather or bunch near the patient, which may then inadvertently contact the patient. This is particularly problematic if the drape is made of non-biocompatible material and contacts open tissue.

Embodiments of the present disclosure advantageously provide a drape that can accommodate equipment movement and also conform to the equipment, thereby preventing excess material from gathering near a patient. Embodiments of the present disclosure beneficially decrease overall operating time (and cost) by reducing the need to manually re-drape equipment during equipment movement. Embodiments of the present disclosure may also beneficially provide monitoring of the drape or other component for potential issues (e.g., leak in the drape or impact to the equipment).

Turning first to FIG. 1, a block diagram of a system 100 according to at least one embodiment of the present disclosure is shown. The system 100 may be used in a sterile environment to prevent contamination of a patient from non-sterile operating equipment. The system 100 may be used to control a volume 101 substantially enclosed by a drape 102. The system 100 may include the drape 102, an articulated member 104 (which may comprise one or more members 104A connected by one or more joints 104B), a pressure source 110, at least one sensor 114, a navigation system 116, and/or a computing device 118. In some embodiments of the present disclosure, systems such as the system 100 of FIG. 1 may not include one or more of the illustrated components, may include other components not shown in FIG. 1, and/or may include components similar to, but not the same as, one or more components of the system 100 shown in FIG. 1. For example, the system 100 may not include the at least one sensor 114, the navigation system 116, and/or the computing device 118.

The articulated member 104 may be, for example, a surgical robot (or any component thereof), a robotic arm, an articulated arm, or the like. The articulated member 104 may extend from a base 103 that may be stationary or movable. One or more tools 106 may be disposed on an end of the articulated member 104, though the one or more tools 106 may be disposed on any portion of the articulated member 104. The articulated member 104 is operable to execute one or more planned movements and/or movements autonomously and/or based on input from a surgeon or operator. In some embodiments, the articulated member 104 and the base 103 may form a robot 134. The robot 134 may be any surgical robot or surgical robotic system. The robot 134 may be or comprise, for example, the Mazor X™ Stealth Edition robotic guidance system. Some embodiments use a non-articulated member that could be moved during a surgical operation.

Figure 3:
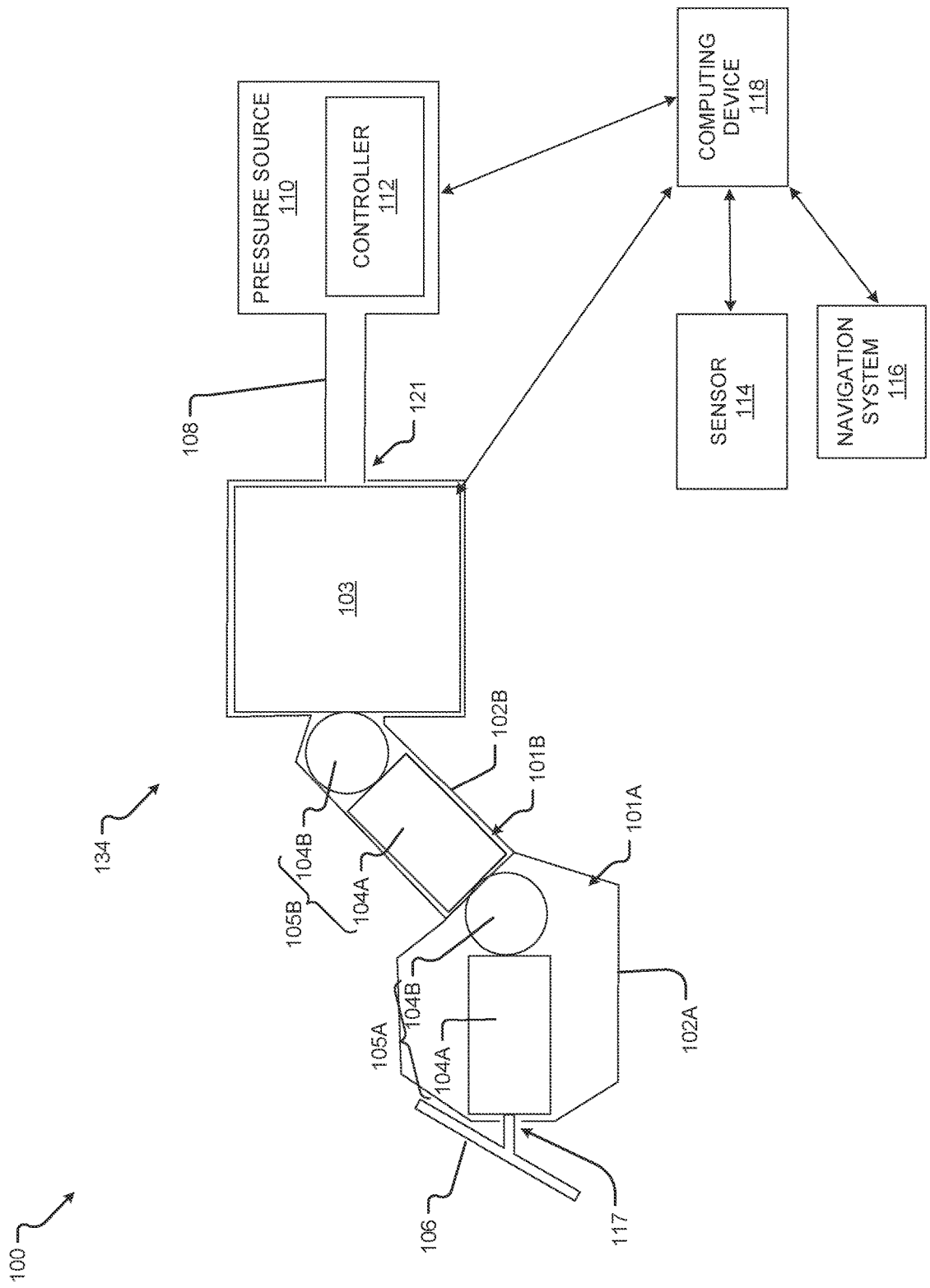
FIG. 3 is a block diagram of another system according to at least one embodiment of the present disclosure.

The drape 102 may substantially enclose the articulated member 104, such that at least 75% of the length of the articulated member (a measured along the articulated member, from a point proximate to but not including the tool 106 toward the base 103) is enclosed by the drape 102. In some embodiments, the drape 102 may sufficiently enclose the articulated member 104 to at least provide a barrier between the articulated member and a patient and thus to prevent contamination of the patient or of the surgical site by the non-sterile articulated member 104. In some examples, the entire articulated member 104 is enclosed by the drape 102, and in other examples, the drape 102 encloses the entire articulated member 104 and at least some of the base 103. In still other examples a first portion of the articulated member 104 may be enclosed by the drape 102 and a second portion of the articulated member 104 may not be enclosed by the drape 102. In some examples, portions of, or the entire drape 102 may be shaped to match proportions of the articulated member 104. In other embodiments, the drape 102 may form, for example, a spherical, rectangular, or oblong shape to accommodate articulated members 104 of various shapes. In yet other embodiments, the drape 102 may further be segmented and include a plurality of sections that may be individually inflated or deflated, as shown in FIG. 3.

The drape 102 is disposable in some embodiments, though the drape 102 may be reusable in other embodiments. The drape 102 is also non-biocompatible (e.g., nylon) in some embodiments, though the drape 102 may be biocompatible in other embodiments. In another embodiment, the drape 102 may contain a combination of biocompatible material and non-biocompatible material. For example, a portion of the drape 102 near the patient may be biocompatible and a remaining portion of the drape 102 may be non-biocompatible.

The drape 102 may include at least one opening. The at least one opening may be or comprise a pressure source opening 121 and/or at least one tool opening 117. In some embodiments, the drape 102 may comprise a plurality of pressure source openings 121 and/or a plurality of tool openings 117. In some embodiments wherein the drape 102 is segmented (as shown in FIG. 3), one or more of the plurality of sections of the drape may each include a pressure source opening 121 and/or at least one tool opening 117. The pressure source opening 121 may define a path for a fluid to flow into or out of the volume 101 substantially enclosed by the drape 102. In some embodiments, the drape 102 does not include a pressure source opening or a tool opening. For example, in some embodiments, an imaging device disposed on an end of the articulated member 104 may operable from behind the drape 102, and therefore may be enclosed by the drape 102 such that the drape 102 need not include the tool opening. In other embodiments, the pressure source may be disposed inside of the drape 102 (e.g., on the articulated member 104, the robot 134, or any component inside of the drape 102), such that the drape 102 need not include a pressure source opening.

As will be described in more detail below, the drape 102 increasingly conforms to the articulated member 104 as the volume 101 substantially enclosed by the drape 102 is decreased. As the volume 101 substantially enclosed by the drape 102 is increased, the shape of the volume 101 is increasingly defined by the construction of the drape 102.

The at least one tool opening 117 may enable the tool 106 to be supported by the articulated member 104 outside of the volume 101 substantially enclosed by the drape 102. In other words, at least a portion of or the entire tool 106 may extend from inside of the drape 102 to outside of the drape 102 through the at least one tool opening 117. The at least one tool opening 117 may be sealed around a portion of the tool 106 (or a holder of the tool 106) by, for example, a rubber seal, tape, hook and loop fabric (e.g., Velcro®), rubber band, elastic, adhesive, silicone, caulk, or the like. Similarly, the pressure source opening 121 may be sealed around a hose 108 (or another device for placing the pressure source 110 in fluid communication with the volume 101) by, for example, a rubber seal, tape, hook and loop fabric (e.g., Velcro®), rubber band, elastic, adhesive, silicone, caulk, or the like.

The pressure source 110 may be operable to selectively increase, maintain, and/or decrease the volume 101 substantially enclosed by the drape 102 by selectively applying a positive pressure or a negative pressure to the volume 101. In other words, the pressure source 110 may cause fluid to enter the drape 102 or to exit the drape 102, whether continuously or intermittently. The fluid may be a gas (e.g., oxygen, air, carbon dioxide, heliox) or a liquid. The pressure source 110 may be, for example, a compressor, a pump, or the like. As described above, in some embodiments wherein the drape 102 is segmented (visible in FIG. 3), the pressure source 110 may be operable to selectively increase, maintain, and/or decrease one or more of a plurality of volumes each enclosed by one of the plurality of sections. Alternatively, in some embodiments, each of the plurality of volumes may be selectively increasable, maintainable, and/or decreasable by a separate or dedicated pressure source 110.

In some embodiments, the system 100 includes a hose 108 configured to place the pressure source 110 in fluid communication with the volume 101 substantially enclosed by the drape 102. The hose 108 may be coupled to the pressure source opening 121 and to the pressure source 110. In other embodiments, an end of the hose 108 may be disposed inside of the volume 101 or outside of the volume 101 (e.g., at or near the pressure source opening 121). Though, in other embodiments, the pressure source 110 is directly coupled to the pressure source opening 121 (e.g., via a hose interface). In other words, in some embodiments the hose 108 is not required. In still other embodiments, the pressure source 110 may be positioned near the articulated member 104 or may be attached to the articulated member 104. For example, the pressure source 110 may be positioned within the volume 101, and a hose 108 may be utilized to place an inlet and/or outlet of the pressure source 110 in fluid communication with the pressure opening and thus with the environment surrounding the volume 101.

In the illustrated embodiment, the system 100 includes the controller 112, though in some embodiments the system 100 may not include the controller 112. The controller 112 may be an electronic, a mechanical, or an electro-mechanical controller. The controller 112 may comprise or may be any processor described herein. The controller 112 may comprise a memory storing instructions for executing any of the functions or methods described herein as being carried out by the controller 112. In some embodiments, the controller 112 may be configured to simply convert signals received from the computing device 118 (e.g., via a communication interface 122) into commands for operating the pressure source 110, the sensor 114, the navigation system 116, and/or the robot 134. In other embodiments, the controller 112 may be configured to process and/or convert signals received from the pressure source 110, the sensor 114, the navigation system 116, and/or the robot 134. Further, the controller 112 may receive signals from one or more sources (e.g., the pressure source 110, the sensor 114, the navigation system 116, the computing device 118, and/or the robot 134) and may output signals to one or more sources.

Figure 2:
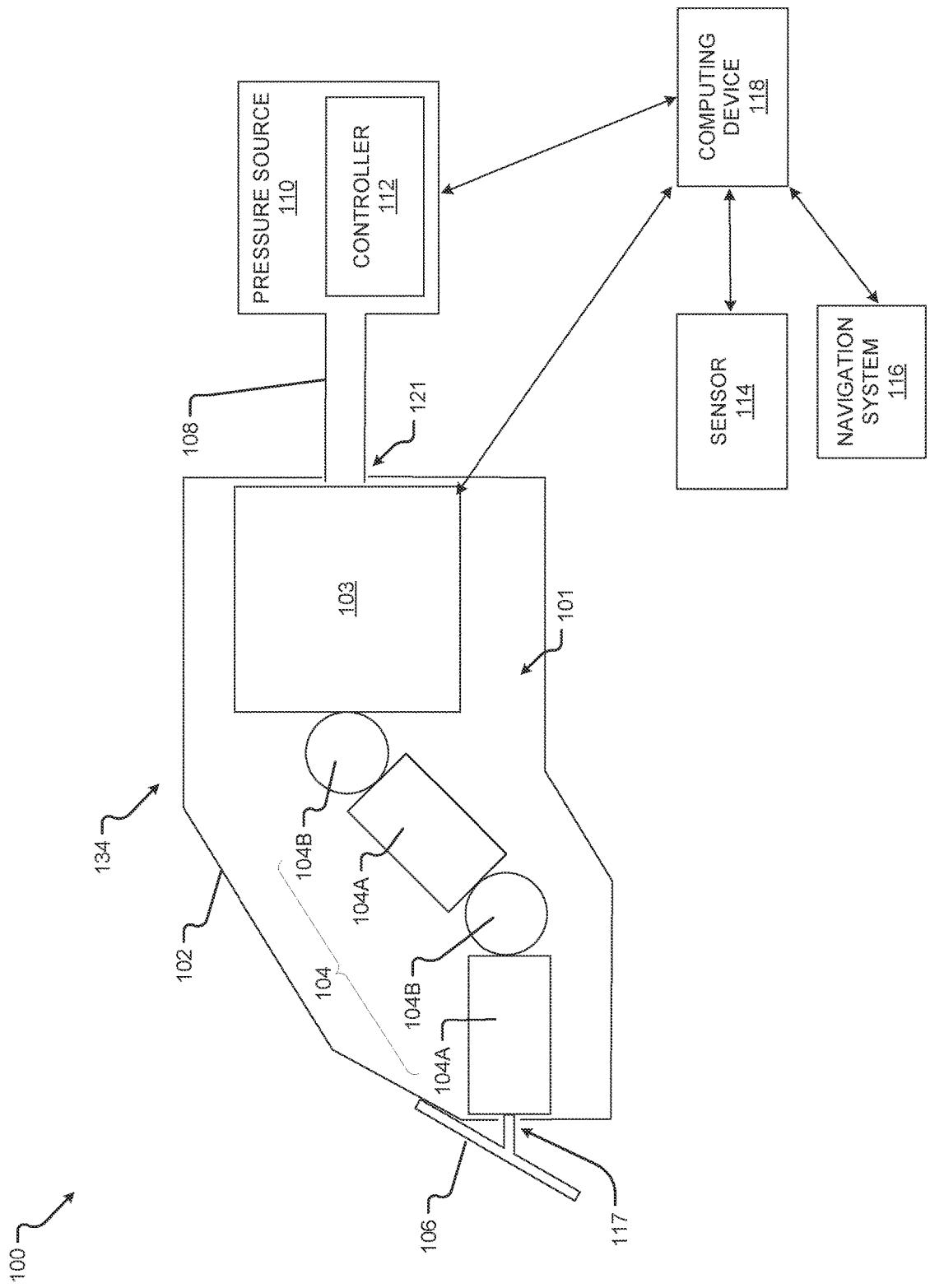
FIG. 2 is a block diagram of another system according to at least one embodiment of the present disclosure.

The controller 112 is operable to control the pressure source 110 and thus cause the volume 101 substantially enclosed by the drape 102 to increase or decrease between a maximum volume and a minimum volume (and/or any intermediate volume), and/or to maintain a constant size and/or pressure, and/or to maintain within a range of sizes and/or a range of pressures, and/or to maintain an operating volume. The operating volume may be the maximum volume, the minimum volume, or between the maximum volume and the minimum volume. As shown in FIG. 1, the minimum volume corresponds to the drape 102 conforming to the articulated member 104, and as shown in FIG. 2, the maximum volume corresponds to the drape 102 being spaced apart from the articulated member 104 or a portion thereof, whether to reduce a risk of the drape 102 being caught in a joint 104B or in between a member 104A and a joint 104B during movement of the articulated member 104, or otherwise. It will be appreciated that the articulated member 104 can perform some movement when the volume 101 is at a minimum volume. Stated differently, at least a portion of the articulated member 104 is repositionable when the drape 102 is conformed to the articulated member 104.

In embodiments where the drape 102 is segmented, the controller 112 may cause the pressure source 110 to increase or decrease a fluid flow into one or more sections of the drape 102 to independently increase or decrease a corresponding volume 101 of the one or more sections, respectively. For example, in the illustrated embodiment of FIG. 3, the articulated member 104 includes a first moveable segment 105A and a second moveable segment 105B, and the drape 102 includes a corresponding first portion 102A configured to at least partially enclose the first moveable segment 105A and a second portion 102B configured to at least partially enclose the second segment 105B. A surgical plan may include information about one or more planned movements of the first moveable segment 105A and the second moveable segment 105B. Further, the controller 112 may cause the pressure source 110 to increase the volume 101A enclosed by the first portion 102A of the drape to accommodate movement of the first moveable segment 105A while decreasing or maintaining a volume 101B enclosed by the second portion 102B of the drape when the second moveable segment 105B of the articulated member 104 either does not move or does not move enough to require an increase in the corresponding volume 101B. The controller 112 may cause the pressure source 110 to increase or decrease the volume 101 of the first portion 102A and/or the section portion based on the surgical plan, and/or based on sensed movement of the first moveable segment 105A and/or of the second moveable segment 105B, and/or based on input received from a surgeon or operator. It will be appreciated that the articulated member 104 may include more than two moveable segments and that the drape 102 may include more than two portions. Further, as previously described, it will be appreciated that each portion of the drape 102 may include a pressure source opening and/or a tool opening, though each portion of the drape 102 may not include a pressure source opening and/or may not include a tool opening.

In some embodiments, the controller 112 controls the pressure source 110 to increase, maintain, or decrease a fluid flow into or out of the volume 101, or to increase, maintain, or decrease an internal pressure of the volume 101. The controller 112 may receive an input from the surgeon or operator of the system 100, or may receive a signal from a computing device 118 that corresponds to a command to operate the pressure source 110 in a particular manner (e.g., to increase, decrease, or maintain a size of the volume 101). The controller 112 may alternatively operate the pressure source 110 autonomously, whether based on a detected or planned movement of the articulated member 104 or information from a sensor 114 or a computing device 118, or based on a surgical plan as described in more detail below, or otherwise. The controller 112 may also operate the pressure source 110 based on a distance between the articulated member 104 on the one hand and the patient and/or a tissue or anatomical feature of the patient on the other hand. For example, when the articulated member 104 is very close to the open tissue of the patient, the controller 112 may decrease (or maintain in a decreased position) the volume 101 to avoid contact between the drape 102 and the patient's open tissue. Where the drape 102 is segmented as described above, the controller 112 may decrease (or maintain in a decreased position) only the volume 101 corresponding to the portion of the articulated member 104 that is near the patient's open tissue, without changing the volume 101 corresponding to other portions of the articulated member 104.

The controller 112 may cause the pressure source 110 to form a vacuum between the drape 102 and the articulated member 104 by causing the fluid to exit the substantially enclosed volume 101 via the pressure source opening 121. Maintaining a vacuum or atmospheric pressure may advantageously lower risk of contamination (e.g., infection) of a patient if a leak through the drape 102 occurs, as potentially contaminated air will be continuously removed from or held within the volume 101 and may thus be kept away from the patient. The controller 112 may also cause the pressure source 110 to form any range of pressure (e.g., high pressure, low pressure, atmospheric pressure, etc.) within the volume 101. The controller 112 may also cause the pressure source 110 to constantly remove air to maintain pressure inside of the drape 102, though in other embodiments, the controller 112 may reset the pressure (e.g., atmospheric, vacuum, etc.) at periodic intervals. In some embodiments, the controller 112 may cause the pressure source 110 to operate continuously (e.g., when transitioning between a minimum volume to a maximum volume, or vice versa), while in other embodiments, the controller 112 may cause the pressure source 110 to operate intermittently (e.g., while maintaining a current volume).

The controller 112 may also cause the volume 101 substantially enclosed by the drape 102 to increase or decrease based at least in part on movement of the articulated member 104. For example, the controller 112 may increase the volume 101 (e.g., increase the fluid flow from the pressure source 110 into the volume 101) when one of the at least one sensor 114 senses movement from the articulated member 104, and may decrease the volume 101 (e.g., decrease the fluid flow and create a negative pressure from the pressure source 110) when the sensor 114 no longer detects movement from the articulated member 104. In some embodiments, the same computing device 118 or controller 112 operates or causes operation of the pressure source 110 and the articulated member 104, such that appropriate commands for increasing or decreasing the volume 101 may be provided to the pressure source 110 in connection with operation of the articulated member 104, rather than when operation of the articulated member 104 is detected. In other examples, the controller 112 may increase or decrease the volume 101 based on one or more preplanned movements. The controller 112 may further cause the volume 101 substantially enclosed by the drape 102 to decrease to or remain at the minimum volume (or another volume) when the articulated member 104 is stationary. The controller 112 may also detect an impact to the articulated member 104 and/or the drape 102 based on data received from the at least one sensor 114, as will be described in more detail below.

The system 100 may include the at least one sensor 114, though in some embodiments the system 100 may not include any sensor 114. The at least one sensor 114 is operable to measure or monitor a characteristic of the system 100. The characteristic may include, but is not limited to, one or more of a leak (e.g., a leak through the drape 102), an impact (e.g., to the drape 102, the tool 106, and/or the articulated member 104), a pressure (e.g., a pressure of the volume 101), a change in pressure (e.g., whether due to a leak, malfunctioning of the pressure source 110, or otherwise), a movement (e.g., of the articulated member 104), or the like. In some embodiments, the characteristic is a pressure inside the volume 101 substantially enclosed by the drape 102.

The sensor 114 may be any kind of sensor 114 for measuring the characteristic herein. The sensor 114 may include one or more or any combination of components that are electrical, mechanical, electro-mechanical, magnetic, electromagnetic, or the like. The sensor 114 may include, but is not limited to, one or more of a pressure transducer, a flowmeter, a strain gauge, a capacitor, or an accelerometer. In some embodiments, the sensor 114 may include a memory for storing sensor data. In still other examples, the sensor 114 may output signals (e.g., sensor data) to one or more sources (e.g., the pressure source 110, the controller 112, the navigation system 116, the computing device 118, and/or the robot 134).

In some examples, the at least one sensor 114 may trigger the controller 112 (e.g., by sending a signal directly to the controller 112 or via the computing device 118) to increase or decrease a fluid flow into or out of the volume 101 when the pressure changes. In other examples, the at least one sensor 114 may trigger the controller 112 to selectively operate the pressure source 110 to achieve a predetermined pressure within the volume 101. In still other examples, the at least one sensor 114 may trigger an alert or a notification to a surgeon or operator that the pressure has increased suddenly, thereby possibly indicating a collision of the drape 102 with another object, or that the pressure has decreased or is decreasing, thereby possibly indicating a leak in the drape 102 or some other malfunction. In embodiments where the characteristic is a fluid flow through the pressure source opening 121 and/or the hose 108, the at least one sensor 114 may trigger an alert or notification if the fluid flow changes. For example, a change in the fluid flow may indicate an issue with the pressure source 110 and/or the drape 102.

The at least one sensor 114 may be positioned inside the volume 101 substantially enclosed by the drape 102 in some embodiments, or may be positioned at the pressure source opening 121 in other embodiments. The at least one sensor 114 may also be positioned at the pressure source 110 in further embodiments. The at least one sensor 114 can be positioned at or on any component of the system 100 or environment (e.g., on any portion of the drape, articulated member, tool, robot, hose, pressure source, navigation system, and/or any other component at the surgical site). The location of the at least one sensor 114 may be determined based on the characteristic that the at least one sensor 114 will measure or monitor. For example, if the at least one sensor 114 will measure an interior pressure of the volume 101, then the at least one sensor 114 may be placed on the articulated member 104 or on an interior surface of the drape 102. On the other hand, if the at least one sensor 114 will measure fluid flow through the pressure source opening 121, then the at least one sensor 114 may be placed adjacent or within the pressure source opening 121, or within the hose 108. Further, the at least one sensor 114 may include a plurality of sensors and each sensor may be positioned at the same location or a different location as any other sensor.

The at least one sensor 114 may be operable to sense a change in pressure of the volume 101, a change in fluid flow rate at the pressure source 110, a change in fluid flow rate at the pressure source opening 121, or the like. As previously described, data regarding the measured or monitored characteristic may be directly useful (e.g., a measured pressure may be compared against a target pressure to determine whether and to what extent the pressure source 110 needs to be operated) and/or indirectly useful (e.g., a sudden increase in pressure may be indicative of a collision between the drape 102 surrounding the articulated member 104 and another object, or a constantly dropping pressure (when the desired pressure is positive) or a constantly rising pressure (when the desired pressure is negative) may be indicative of a leak in the drape 102 or elsewhere in the pressurized system). The at least one sensor 114 may send data to the controller 112 when the at least one sensor 114 detects a change in the characteristic. Further, in some embodiments, the at least one sensor 114 may send data to the computing device 118 to display on a user interface 126 (shown in FIG. 4) or otherwise notify the surgeon or operator of the change in the characteristic. In other embodiments, the at least one sensor 114 may alert the surgeon or operator of the change in the characteristic by an alert such as, but not limited to, a sound or a light display. The at least one sensor 114 may advantageously provide a safety function by monitoring and alerting the surgeon or operator of one or more changes in the system 100, thereby alerting the surgeon or operator of potential issues with the pressure source 110, the drape 102, the articulated member 104, or any other component or aspect of the system 100.

In some embodiments, the system 100 may include a navigation system 116, though in other embodiments, the system 100 may not include a navigation system 116. The navigation system 116 may provide navigation for a surgeon and/or a surgical robot during an operation. The navigation system 116 may be any now-known or future-developed navigation system, including, for example, the Medtronic StealthStation™ S8 surgical navigation system. In various embodiments, the navigation system 116 may be used to track a position of the articulated member 104 (or, more particularly, of a navigated tracker attached to the articulated member 104). The navigation system 116 may include a camera or other sensor(s) for tracking one or more reference markers, navigated trackers, or other objects within the operating room. The navigation system 116 may include a display for displaying one or more images from an external source (e.g., the computing device 118, camera, or other source) or a video stream from the camera or other sensor of the navigation system 116. In some embodiments, the navigation system 116 may provide position, movement, and/or other information to the controller 112 and/or to the computing device 118 for use in controlling the pressure source 110 and/or any other aspect of the system 100. In some embodiments, the system 100 can operate without the use of the navigation system 116.

Figure 4:
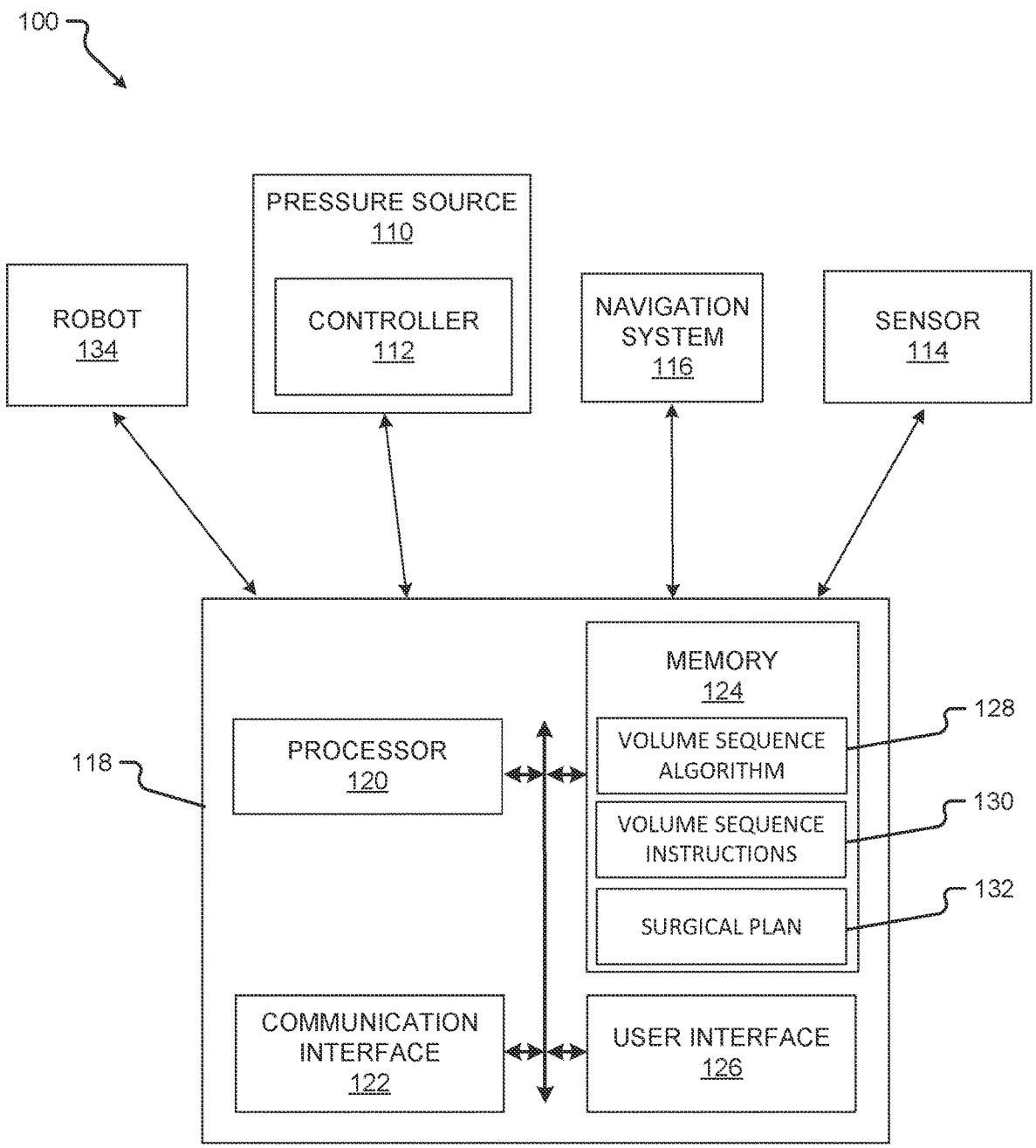
FIG. 4 is a block diagram of yet another system according to at least one embodiment of the present disclosure.

Turning to FIG. 4, the system 100 having a computing device 118 is shown. The computing device 118 according to embodiments of the present disclosure may comprise a processor 120, a memory 124, a communication interface 122, and the user interface 126. Other components of the system 100 (e.g., the pressure source 110, the controller 112, the sensor 114, the navigation system 116, and/or the robot 134) illustrated in FIG. 4 are described above with respect to FIGS. 1-2. In some embodiments of the present disclosure, systems such as the system 100 of FIG. 4 may not include one or more of the illustrated components, may include other components not shown in FIG. 4, and/or may include components similar to, but not the same as, one or more components of the system 100 shown in FIG. 4. Further, a computing device such as computing device 118 in some embodiments may have more components or fewer components than the computing device 118.

The processor 120 of the computing device 118 may be any processor described herein or any similar processor. The processor 120 may be configured to execute instructions stored in the memory 124, which instructions may cause the processor 120 to carry out one or more computing steps utilizing or based on data received from the user interface 126, the at least one sensor 114, the robot 134, the controller 112, and/or the navigation system 116.

The memory 124 may be or comprise RAM, DRAM, SDRAM, other solid-state memory, any memory described herein, or any other tangible, non-transitory memory for storing computer-readable data and/or instructions. The memory 124 may store information or data useful for completing any step of the method 500 described herein. The memory 124 may store, for example, one or more volume sequence algorithms 128, one or more volume sequence instructions 130, and/or one or more surgical plans 132. Such instructions 130 and/or algorithms 128 may, in some embodiments, be organized into one or more applications, modules, packages, layers, or engines. The algorithms 128 and/or instructions 130 may cause the processor 120 to manipulate data stored in the memory 124 and/or received from the navigation system 116.

The computing device 118 may also comprise a communication interface 122. The communication interface 122 may be used for receiving sensor data or other information from an external source (such as the pressure source 110, the controller 112, the at least one sensor 114, the robot 134, and/or the navigation system 116), and/or for transmitting instructions, data, or other information to an external system or device (e.g., the pressure source 110, the controller 112, the at least one sensor 114, the robot 134, and/or the navigation system 116). The communication interface 122 may comprise one or more wired interfaces (e.g., a USB port, an ethernet port, a Firewire port) and/or one or more wireless interfaces (configured, for example, to transmit information via one or more wireless communication protocols such as 802.11a/b/g/n, Bluetooth, NFC, ZigBee, and so forth). In some embodiments, the communication interface 122 may be useful for enabling the computing device 118 to communicate with one or more other processors 120 or computing devices 118, whether to reduce the time needed to accomplish a computing-intensive task or for any other reason.

The computing device 118 may also comprise one or more user interfaces 126. The user interface 126 may be or comprise a keyboard, mouse, trackball, monitor, television, touchscreen, joystick, switch, button, and/or any other device for receiving information from a user and/or for providing information to a user. The user interface 126 may be used, for example, to receive a user selection or other user input regarding a surgical plan; to receive user input useful in connection with determining a sequence of selectively increasing and decreasing the volume 101 substantially enclosed by the drape 102; to receive user input regarding generating instructions based on the sequence; and/or to display the instructions for causing the controller 112 to control the pressure source 110. In some embodiments, the user interface 126 may be useful to allow a surgeon or other user to modify the first instructions, the second instructions, or other information displayed. In some embodiments, user input such as that described above may be optional or not needed for operation of the systems, devices, and methods described herein.

Although the user interface 126 is shown as part of the computing device 118, in some embodiments, the computing device 118 may utilize a user interface 126 that is housed separately from one or more remaining components of the computing device 118. In some embodiments, the user interface 126 may be located proximate one or more other components of the computing device 118, while in other embodiments, the user interface 126 may be located remotely from one or more other components of the computing device 118.

Figure 5:
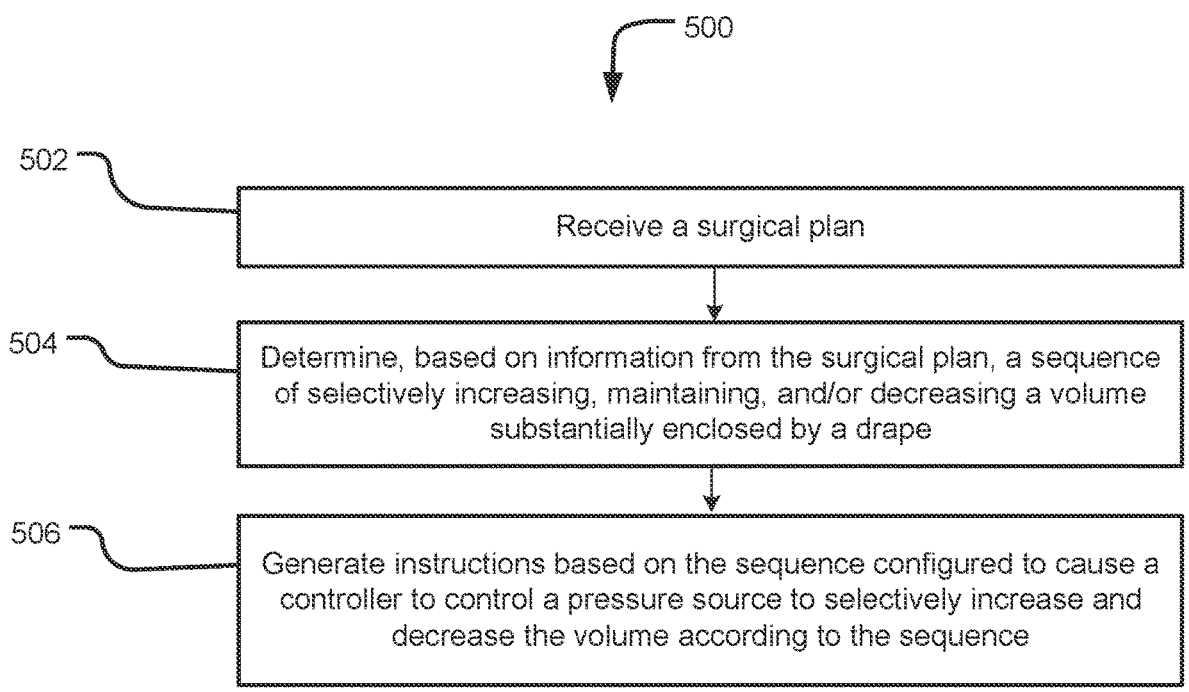
FIG. 5 is a flowchart of a method according to at least one embodiment of the present disclosure.

Turning now to FIG. 5, a method 500 for controlling the volume 101 of the drape 102 according to embodiments of the present disclosure may be executed in whole or in part on a computing device 118. The method 500 may be performed using, for example, the system 100 described above with respect to FIGS. 1-3.

The method 500 comprises receiving a surgical plan 132 (step 502). The surgical plan 132 may be received via the user interface 126 and/or communication interface 122 of a computing device 118, and may be stored in the memory 124. The surgical plan 132 may include information about one or more planned movements of the articulated member 104 substantially enclosed by the drape 102 during a surgical procedure. The information may also include a timeline or schedule of the one or more planned movements. The one or more planned movements may include one or more of timestamps, a type of movement (e.g., translational and/or rotational), a duration of the movement, and/or positional information (e.g., coordinates).

In some embodiments, the method 500 may comprise determining information about one or more needed movements of the articulated member 104 during a surgical procedure outlined or otherwise described in the surgical plan 132. In such embodiments, the surgical plan may not include any such information as received by the computing device 118, but the processor 120, executing instructions stored in the memory 124, may generate such information based on the surgical plan 132.

The method 500 also comprises determining, based on the information about one or more planned or needed movements of the articulated member 104, a sequence of selectively increasing, maintaining, and/or decreasing the volume 101 substantially enclosed by the drape 102 (step 504). As described above, the drape 102 may at least partially surround the articulated member 104. One or more volume sequence algorithms 128 may be configured to determine a sequence of selectively increasing, maintaining, and decreasing the volume 101. In some embodiments, determining the sequence may be based on the timeline or schedule of the one or planned movements. In other embodiments, determining the sequence may be based on one or more of timestamps, a type of each movement (e.g., translational and/or rotational), a duration of each movement, and/or positional information (e.g., coordinates).

Further, the sequence may comprise increasing the volume 101 substantially enclosed by the drape 102 prior to a planned movement of the articulated member 104 that exceeds a predetermined threshold. In other words, determining the sequence may include calculating a change in position of the articulated member 104 for each movement, identifying if the change exceeds or meets a predetermined threshold (which may, for example, be stored in the memory 124, and/or may be specific to the articulated member 104, the robot 134, the drape 102, or any other component of the system 100), and determining that the volume 101 is to be increased when the change exceeds or meets the threshold or that the volume 101 is to be maintained or decreased to the minimum volume if the change is below the threshold. Thus, movements of the articulated member 104 that are below the predetermined threshold may be executed without increasing the volume 101. When the volume 101 is increased due to a change in position of the articulated member 104 that exceeds or meets the threshold, the volume 101 may be decreased to the minimum volume (or to an intermediate volume) after the articulated member 104 has completed the corresponding movement.

The method 500 further comprises generating instructions based on the sequence (step 506). The generated instructions may be volume sequence instructions 130. The volume sequence instructions 130 may be configured to cause the volume 101 to be selectively increased, maintained, and decreased based on the determined sequence. The instructions may be configured, for example, to cause the controller 112 to control the pressure source 110 to selectively increase and decrease the volume 101 according to the sequence.

In some embodiments, however, the controller 112 may control the pressure source 110 to automatically increase and decrease the volume 101 based on instructions stored in a memory thereof that are not based on a surgical plan. For example, the controller 112 may be configured to automatically begin increasing the volume 101 when the articulated member 104 begins to move, and to begin decreasing the volume 101 when the articulated member 104 stops. The controller 112 may further be configured to automatically maintain a predetermined pressure within the volume when the articulated member is not moving.

The instructions may include one or more instructions that cause an alert or other indication to be given to the surgeon (e.g., via the user interface 126) prior to each movement of the articulated member 104, and/or prior to executing one of the one or more planned volume increases or decreases. In some embodiments, such an alert may pause execution of the surgical plan 132 for approval by the surgeon or other operator. In other embodiments, the alert may simply notify the surgeon of the planned movement and/or of the planned volume increase or decrease, and automatically execute the planned movement. The alert and/or notification may be displayed on the user interface 126 and/or may include a sound and/or a visual display.

As may be appreciated based on the foregoing disclosure, the present disclosure encompasses methods with fewer than all of the steps identified in FIG. 5 (and the corresponding description of method 500), as well as methods that include additional steps beyond those identified in FIG. 5 (and the corresponding description of method 500).

The methods and systems described herein provide a drape for protecting a patient from a non-sterile object during a surgical procedure. The drape can be caused to expand to accommodate movement of moveable equipment enclosed by the drape and can also be caused to conform to the moveable equipment, by utilizing a pump, compressor, or other pressure source to selectively increase or decrease a volume enclosed by the drape. The methods and systems advantageously allow for movement of the equipment without the need for re-draping, without risking the drape getting caught in the articulated arm or any component(s) thereof, and without creating a bunching of excess material near the patient. The methods and systems may also provide monitoring of the system and/or any individual component(s) thereof (e.g., the drape, the articulated member, and/or the pressure source), thereby alerting the surgeon or operator to potential disturbances to the system.

The foregoing discussion has been presented for purposes of illustration and description. The foregoing is not intended to limit the disclosure to the form or forms disclosed herein. In the foregoing Detailed Description, for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system for controlling a volume of a drape comprising:
    a drape configured to at least partially cover an articulated member;
    at least one sensor operable to monitor a characteristic of the system, wherein the characteristic includes an operating pressure within a volume enclosed by the drape; and
    a controller configured to cause a pressure source to change the volume enclosed by the drape by altering the operating pressure in connection with movement of the articulated member such that the volume enclosed by the drape increases to a first volume prior to a planned movement of the articulated member and the volume enclosed by the drape decreases from the first volume to a second volume after the planned movement of the articulated member,
    wherein the drape increasingly conforms to the articulated member as the volume enclosed by the drape is decreased.

2. The system of claim 1, wherein the controller is configured to generate a notification when a change in the operating pressure within the volume enclosed by the drape exceeds a threshold.

3. The system of claim 1, wherein the controller is configured to cause the pressure source to remove fluid from the enclosed volume via a pressure source opening.

4. The system of claim 1, wherein the operating pressure is greater than an ambient pressure.

5. The system of claim 1, wherein the operating pressure is less than an ambient pressure.

6. The system of claim 1, wherein the drape comprises at least one tool opening enabling a tool to be supported by the articulating member outside of the volume enclosed by the drape.

7. A system for controlling a volume substantially enclosed by a drape comprising:
    a pressure source operable to selectively increase, maintain, or decrease a volume between a drape and an articulated member by selectively applying positive pressure or negative pressure to the volume;
    at least one sensor operable to monitor a characteristic of the system, wherein the characteristic includes an operating pressure within the volume enclosed by the drape; and
    a controller that controls the pressure source to change the volume enclosed by the drape by altering the operating pressure in connection with movement of the articulated member such that the volume enclosed by the drape increases to a first volume prior to a planned movement of the articulated member and the volume enclosed by the drape decreases from the first volume to a second volume after the planned movement of the articulated member,
    wherein the drape increasingly conforms to the articulated member as the volume substantially enclosed by the drape is decreased.

8. The system of claim 7, wherein the characteristic includes a fluid flow through an opening in the drape.

9. The system of claim 7, wherein at least a portion of the articulated member is repositionable when the drape is conformed to the articulated member.

10. The system of claim 7, wherein the controller causes the pressure source to form a vacuum between the drape and the articulated member by causing fluid to exit the volume enclosed by the drape via a pressure source opening.

11. The system of claim 10, wherein the vacuum between the drape and the articulated member is continuously maintained to prevent one or more leaks in the drape.

12. The system of claim 7, wherein the characteristic includes movement of the articulated member.

13. The system of claim 7, wherein the characteristic includes one or more leaks in the drape.

14. The system of claim 7, wherein the controller detects an impact to the drape based on data received from the at least one sensor.

15. A method for controlling a volume of a drape comprising:
    receiving a surgical plan, the surgical plan including information about one or more planned movements of an articulated member at least partially enclosed by a drape;
    determining, based on the surgical plan, a sequence of increasing and decreasing a volume enclosed by the drape and surrounding at least part of the articulated member, wherein the articulated member includes a first moveable segment and a second moveable segment, wherein the drape includes a first portion enclosing a first volume that at least partially encompasses the first moveable segment and a second portion enclosing a second volume that at least partially encompasses the second moveable segment, and wherein the surgical plan includes information about one or more planned movements of each of the first moveable segment and the second moveable segment;

monitoring, by at least one sensor, an operating pressure within the volume enclosed by the drape; and generating instructions based on the sequence, the instructions configured to cause a controller to control a pressure source to change the volume enclosed by the drape according to the sequence and by altering the operating pressure to increase the first volume in connection with a planned movement of the first moveable segment of the articulated member while decreasing or maintaining the second volume in connection with a stationary status of the second moveable segment of the articulated member.

16. The method of claim 15, wherein the volume substantially enclosed by the drape is increased prior to a planned movement of the articulated member.

17. The method of claim 15, further comprising generating a notification when a change in the operating pressure within the volume enclosed by the drape exceeds a threshold.

* * * * *